(12) United States Patent
Kojima et al.

(10) Patent No.: US 11,209,765 B2
(45) Date of Patent: Dec. 28, 2021

(54) POWER SUPPLY DEVICE AND IMAGE FORMING DEVICE

(71) Applicant: Oki Data Corporation, Tokyo (JP)

(72) Inventors: Tomoyuki Kojima, Tokyo (JP); Taku Oryoji, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 17/025,702

(22) Filed: Sep. 18, 2020

(65) Prior Publication Data

US 2021/0099077 A1   Apr. 1, 2021

(30) Foreign Application Priority Data

Sep. 30, 2019   (JP) .............................. JP2019-179252

(51) Int. Cl.
| | |
|---|---|
| *G03G 15/00* | (2006.01) |
| *G03G 15/02* | (2006.01) |
| *H02M 1/00* | (2006.01) |
| *H02M 1/42* | (2007.01) |

(52) U.S. Cl.
CPC ......... *G03G 15/80* (2013.01); *G03G 15/0283* (2013.01); *G03G 15/5004* (2013.01); *H02M 1/0035* (2021.05); *H02M 1/007* (2021.05); *H02M 1/4225* (2013.01)

(58) Field of Classification Search
CPC ............... G03G 15/80; G03G 15/0283; G03G 15/5004; H02M 1/0035; H02M 1/007; H02M 1/4225
See application file for complete search history.

(56) References Cited

U.S. PATENT DOCUMENTS

| | | | |
|---|---|---|---|
| 2018/0367029 A1* | 12/2018 | Maruyama | ............... H02M 1/36 |
| 2020/0183484 A1* | 6/2020 | Hirano | ................... G06F 1/3296 |
| 2020/0328671 A1* | 10/2020 | Li | ........................ H02M 1/4225 |

FOREIGN PATENT DOCUMENTS

JP   2013134545 A   7/2013

* cited by examiner

*Primary Examiner* — Joseph S Wong
(74) *Attorney, Agent, or Firm* — Rabin & Berdo, P.C.

(57) ABSTRACT

A power supply device includes a rectification circuit that is supplied with AC power from an AC power supply, a power factor improvement circuit that boosts an output voltage of the rectification circuit, smooths a boosted voltage with a capacitor, and thereby generates a DC output voltage outputted to a load circuit, a DC-DC converter that steps down the DC output voltage to a prescribed first voltage, a DC output voltage detection circuit that detects whether or not the DC output voltage satisfies a prescribed condition, and a switch circuit that temporarily puts the power factor improvement circuit in an operating state by use of the first voltage each time the prescribed condition is satisfied in a period in which the power factor improvement circuit is in a stopped state due to an energy saving mode of the load circuit.

12 Claims, 13 Drawing Sheets

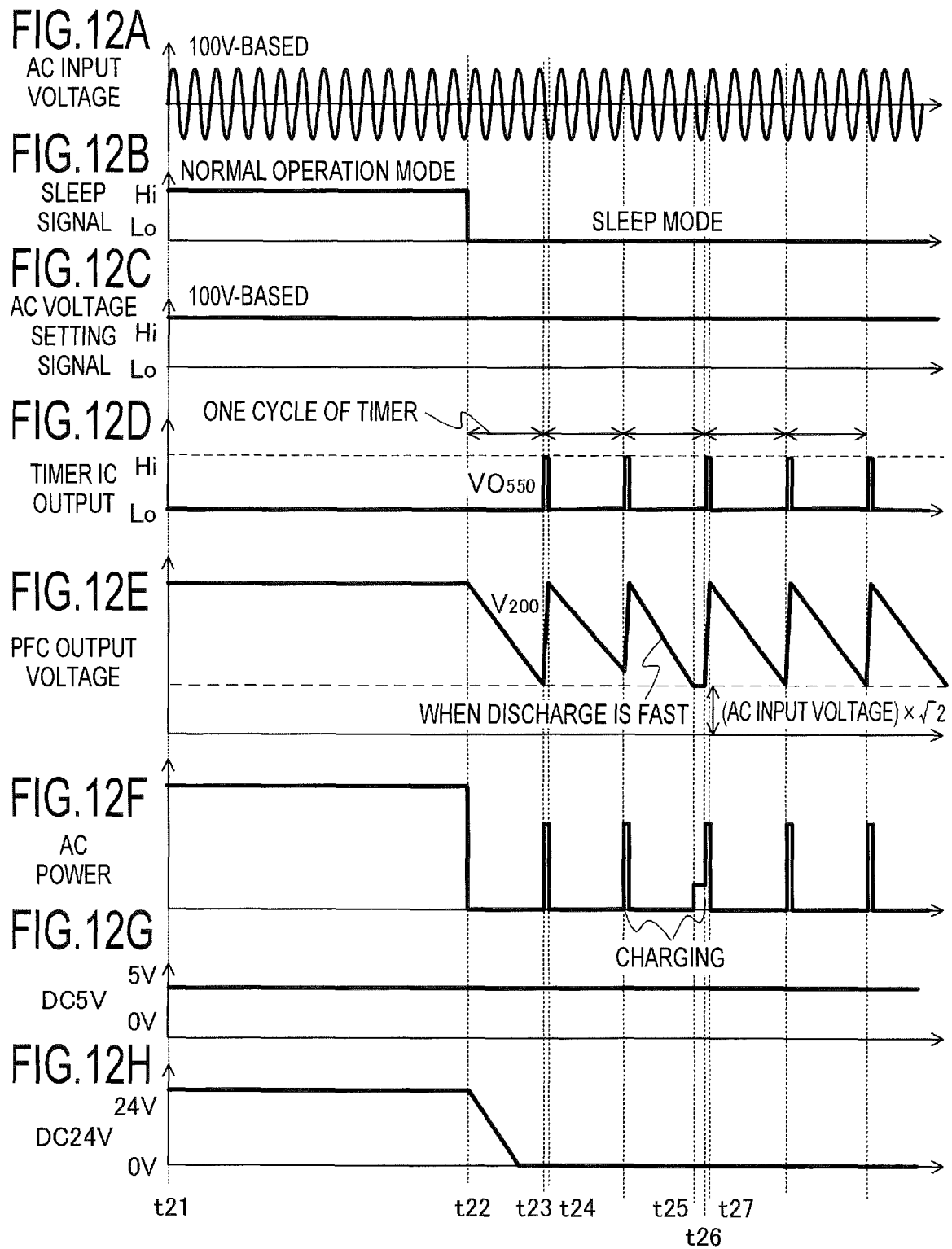

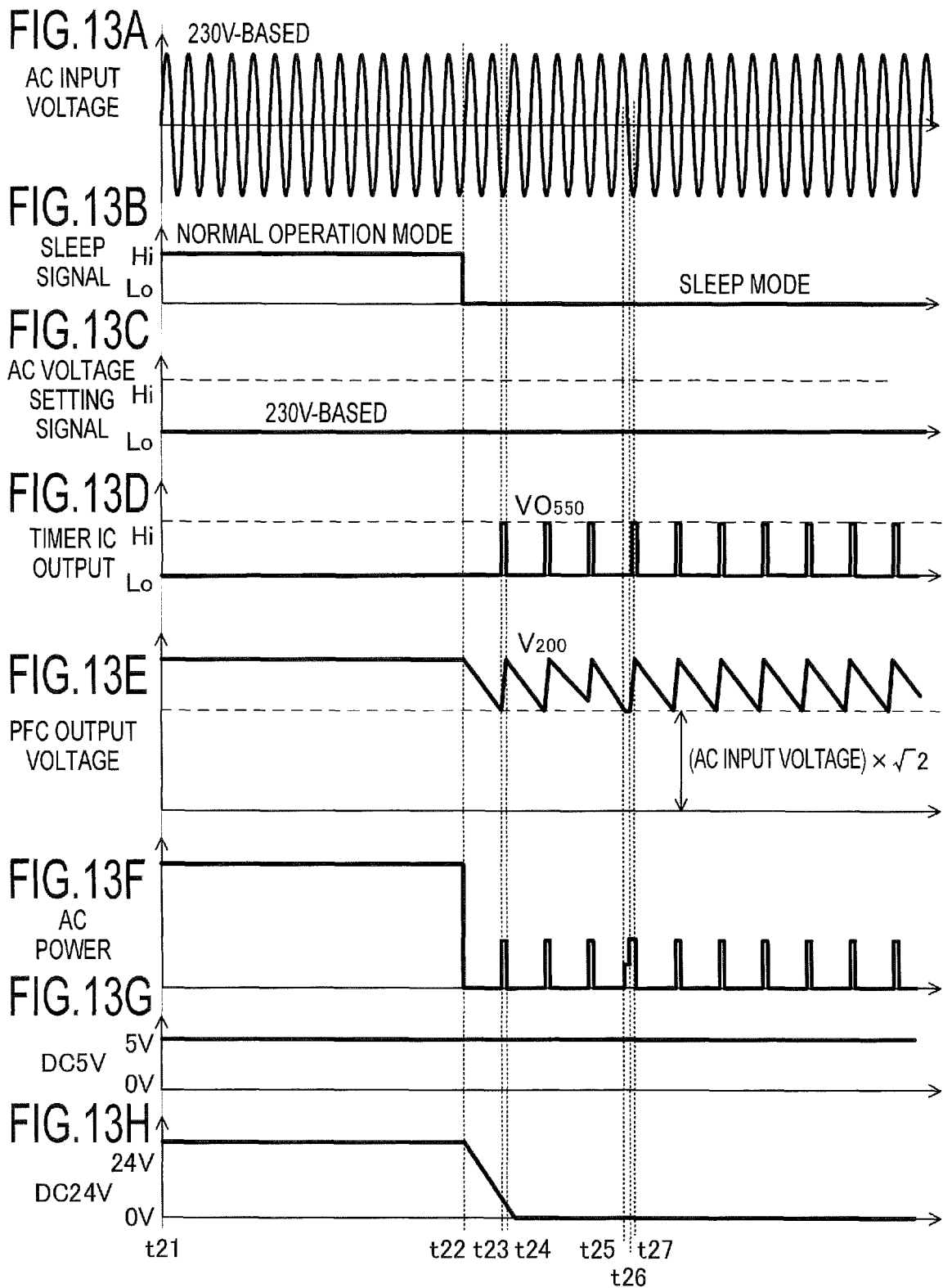

POWER SUPPLY DEVICE AND IMAGE FORMING DEVICE

BACKGROUND OF THE INVENTION

1. Field of the Invention

The present invention relates to a power supply device and an image forming device.

2. Description of the Related Art

Conventionally, in image forming devices, in a low power consumption mode (i.e., energy saving mode), an output voltage supplied from a power supply section (i.e., power supply device) in the image forming device to a load circuit (e.g., control section) is interrupted, and thereby the power supply load is made a low load state or a no load state and the efficiency of the power supply is increased. See Japanese Patent Application Publication No. 2013-134545, for example.

However, even if the output voltage from the power supply section is interrupted, energization of the power supply unit continues, and thus there is a problem in that the increasing of the efficiency of the power supply has a limitation.

SUMMARY OF THE INVENTION

The object of the present invention is to increase the efficiency of the power supply.

A power supply device according to an aspect of the present invention includes a rectification circuit that is supplied with AC power from an AC power supply, a power factor improvement circuit that boosts an output voltage of the rectification circuit, smooths a boosted voltage with a capacitor, and thereby generates a DC output voltage outputted to a load circuit, a DC-DC converter that steps down the DC output voltage to a prescribed first voltage, a DC output voltage detection circuit that detects whether or not the DC output voltage satisfies a prescribed condition, and a switch circuit that temporarily puts the power factor improvement circuit in an operating state by use of the first voltage each time the prescribed condition is satisfied in a period in which the power factor improvement circuit is in a stopped state due to an energy saving mode of the load circuit.

According to the present invention, an advantage is obtained in that the efficiency of the power supply increases.

BRIEF DESCRIPTION OF THE DRAWINGS

In the attached drawings,

FIGS. 12A to 12H are time charts showing an example of operational waveforms of the power supply section according to the second embodiment; and FIGS. 13A to 13H are time charts showing another example of operational waveforms of the power supply section according to the second embodiment.

DETAILED DESCRIPTION OF THE INVENTION

A power supply device and an image forming device including the power supply device according to each embodiment of the present invention will be described below with reference to drawings. The following embodiments are just examples for illustration and a variety of modifications are possible within the scope of the present invention.

(1) First Embodiment

(1-1) Configuration of First Embodiment

Figure 1:
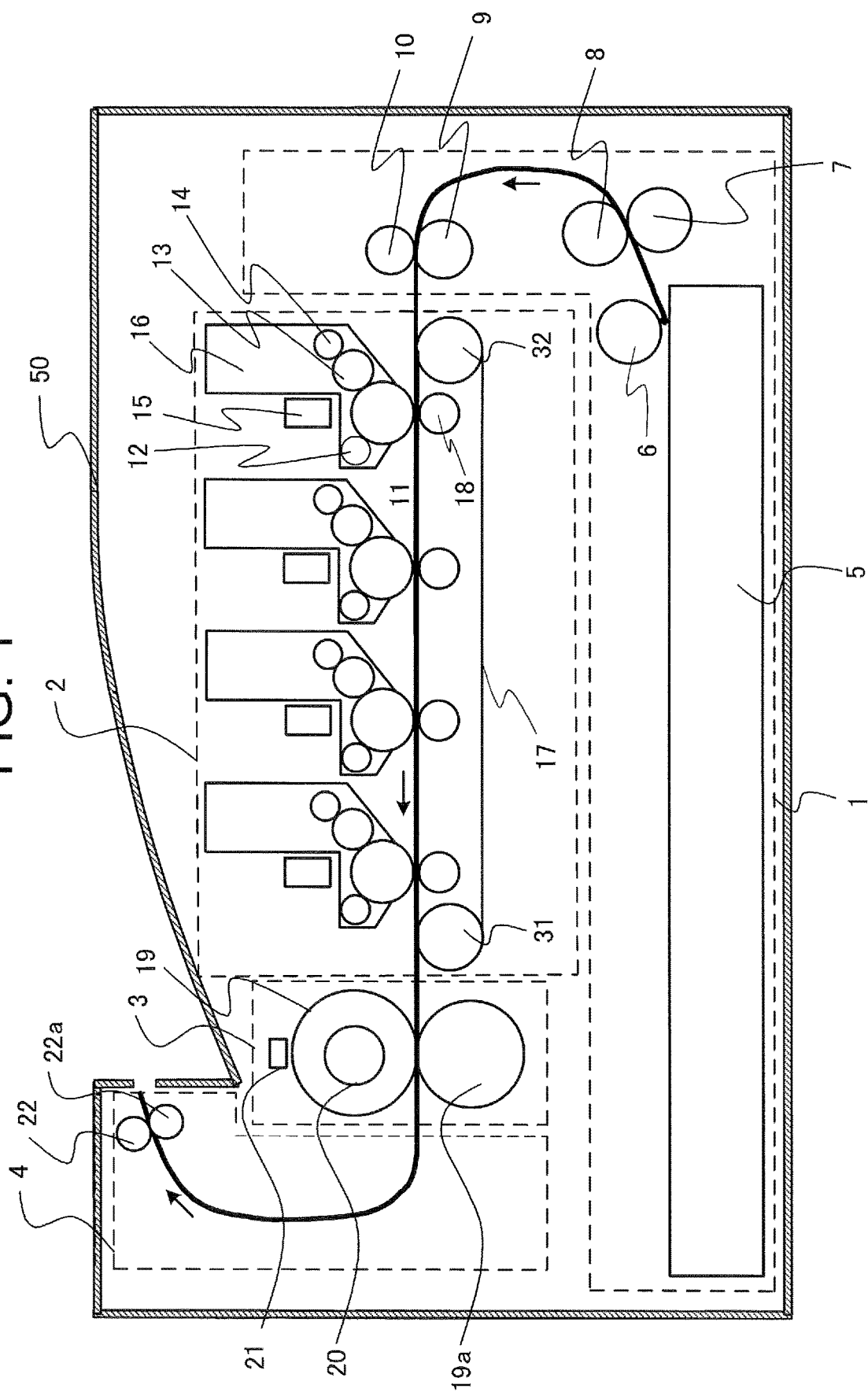
FIG. 1 is a cross-sectional view schematically showing the configuration of an image forming device according to a first embodiment of the present invention.

FIG. 1 is a schematic cross-sectional view showing the configuration of an image forming device 50 according to a first embodiment. The image forming device 50 is a device that forms an image on a record medium by an electrophotographic process. The image forming device 50 is, for example, a printer, a copying machine, a facsimile, or a Multi-Function Peripheral (MFP). The image forming device 50 includes a sheet feed section 1, an image forming section 2, a fixation section 3, and a sheet ejection section 4 as principal components.

The sheet feed section 1 includes a sheet cassette 5 in which sheets as the record media are stacked, pickup rollers 6, 7 and 8 for feeding the sheet, and registration rollers 9 and 10 for conveying the sheet to the image forming section 2.

The image forming section 2 includes image forming units of black (K), yellow (Y), magenta (M) and cyan (C) arranged in this order from the right-hand side of FIG. 1. The number of image forming units is not limited to four. Each image forming unit includes a photosensitive drum 11 as an electrostatic latent image carrier, a charging roller 12 that comes into contact with the photosensitive drum 11 and electrically charges the surface of the photosensitive drum 11 uniformly at a high voltage, a development roller 13 as a toner carrier in contact with the photosensitive drum 11, and a toner supply roller 14 that comes into contact with the development roller 13 and supplies a toner to the development roller 13. Further, in the image forming section 2, an LED head (i.e., light-emitting element array head) 15 as an exposure section is arranged above the photosensitive drum 11, and an attachable and detachable toner cartridge 16 is attached to the image forming unit of each color. Arranged further in the image forming section 2 are a transfer belt 17 as a transfer body that transfers a toner image formed on the photosensitive drum 11 onto the sheet while conveying the sheet and a transfer roller 18 in substantial contact with the photosensitive drum 11 via the transfer belt 17. The transfer belt 17 is stretched across a drive roller 31 and a driven roller 32 and conveys the sheet in the direction of the arrow. Toner images formed on the surfaces of the photosensitive drums 11 of the K, Y, M and C image forming units of the image forming section 2 are transferred onto the sheet.

The fixation section 3 includes fixation rollers 19 and 19a for fixing the toner images transferred onto the sheet, a heater 20 as typified by a halogen lamp arranged inside the fixation roller 19, and a temperature detection sensor 21 as typified by a thermistor for detecting surface temperature of the fixation roller 19. The fixation section 3 fixes the toner images on the sheet by heating and pressing the sheet having the toner images formed thereon.

In the sheet ejection section 4, ejection rollers 22 and 22a for conveying and ejecting the sheet after the completion of the toner image fixation in the direction of the arrow. The sheet having the toner images fixed thereon is ejected from the sheet ejection section 4 to the outside of a housing of the image forming device 50.

Figure 2:
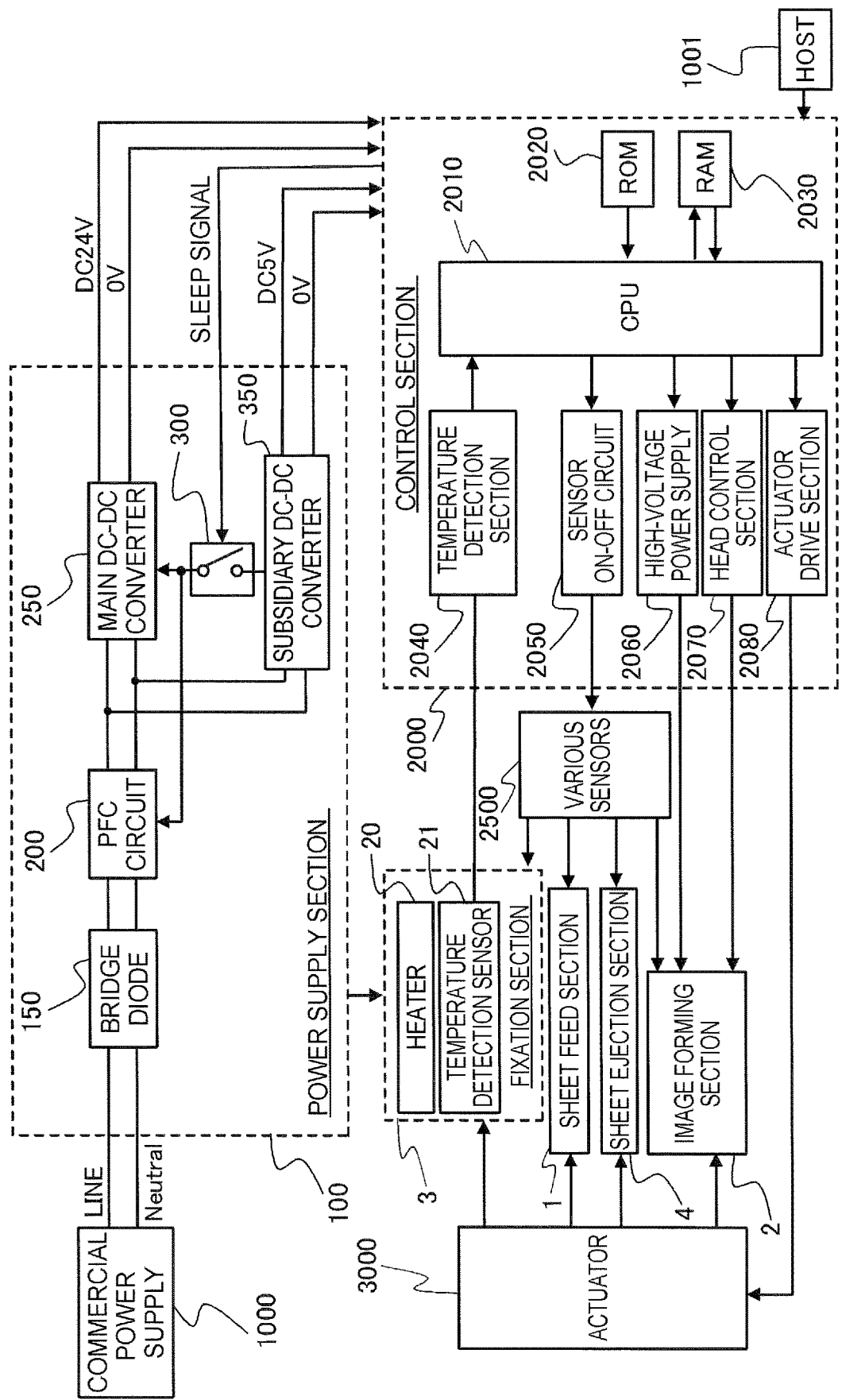
FIG. 2 is a block diagram schematically showing the configuration of an image forming device as a comparative example.

FIG. 2 is a block diagram schematically showing the configuration of an image forming device as a comparative example. The image forming device as the comparative example performs an image forming operation based on a control signal and print data outputted from a host 1001. The host 1001 is a personal computer, for example. In FIG. 2, each component identical to a component shown in FIG. 1 is assigned the same reference character as in FIG. 1.

The image forming device as the comparative example includes a power supply section 100 as a power supply device, the fixation section 3, and a control section 2000. The power supply section 100 includes a bridge diode 150, a PFC circuit 200 as a power factor improvement (power factor correction) circuit, a main DC-DC converter 250, a switch circuit 300, and a subsidiary DC-DC converter 350. DC stands for a direct current. In general, the power supply section 100 is powered by an AC input voltage outputted from a commercial power supply 1000 as an AC power supply. AC stands for an alternating current. The power supply section 100 outputs a DC voltage to a load circuit (e.g., the control section 2000) and the like of the image forming device.

The bridge diode 150 is a bridge-type full-wave rectification circuit that performs full-wave rectification on the AC input voltage outputted from the commercial power supply 1000. The PFC circuit 200 is an AC-DC converter that converts the AC input voltage into a DC voltage as a circuit for the purpose of power factor improvement. The PFC circuit 200 receives the full-wave rectified voltage from the bridge diode 150 as the input and outputs the DC voltage to the main DC-DC converter 250 and the subsidiary DC-DC converter 350.

The main DC-DC converter 250 receives the DC voltage from the PFC circuit 200 as the input and outputs DC 24V to components such as the control section 2000. The main DC-DC converter 250 steps down the DC voltage, which has been boosted by the PFC circuit 200, by using an insulated transformer in which a primary side and a secondary side are insulated from each other. Similarly to the main DC-DC converter 250, the subsidiary DC-DC converter 350 steps down the DC voltage by using an insulated transformer in which the primary side and the secondary side are insulated from each other and outputs DC 5V to components such as the control section 2000.

The switch circuit 300 is a circuit that turns on and off according to a sleep signal outputted from the control section 2000. When the switch circuit 300 is on, the DC 5V outputted from the subsidiary DC-DC converter 350 is supplied to a PFC control circuit (157 which will be explained later) of the PFC circuit 200 and the main DC-DC converter 250. The fixation section 3, the heater 20 and the temperature detection sensor 21 are components that have been described with reference to FIG. 1.

The control section 2000 includes a CPU (Central Processing Unit) 2010, a ROM (Read Only Memory) 2020, a RAM (Random Access Memory) 2030, a temperature detection section 2040, a sensor on-off circuit 2050, a high-voltage power supply 2060, a head control section 2070 and an actuator drive section 2080.

The CPU 2010 is a processor that operates according to a program that has been written to the ROM 2020 as a nonvolatile storage component storing the program, setting data, and so on. The CPU 2010 also includes a counter for measuring time and the like. The RAM 2030 is a memory on which data storage, data loading, and so on are performed. The temperature detection section 2040 performs resistive voltage dividing on the output of the temperature detection sensor 21 of the fixation section 3 and outputs a temperature detection signal to the CPU 2010. The sensor on-off circuit 2050 is formed with transistors and turns off electric power supplied to various sensors 2500 which will be described later based on a sensor off signal outputted from the CPU 2010 at a time of starting a sleep mode as an energy saving mode.

The high-voltage power supply 2060 is a power supply that applies a high voltage to the photosensitive drums 11 and various rollers of the image forming section 2 shown in FIG. 1. The head control section 2070 is a circuit that performs on-off control of a plurality of LEDs of the LED head 15 shown in FIG. 1. The actuator drive section 2080 is a purpose-built driver that outputs a drive signal to an actuator 3000 described later based on a logic signal outputted from the CPU 2010. The sheet feed section 1, the image forming section 2 and the sheet ejection section 4 are components that have been described with reference to FIG. 1.

The various sensors 2500 include non-illustrated sheet sensors that detect the position of the sheet in a sheet travel path in the sheet feed section 1, the image forming section 2, the fixation section 3, and the sheet ejection section 4. Further, the various sensors 2500 include an optical sensor or the like used for correcting image density or color drift. The actuator 3000 includes a motor, a clutch. a solenoid, an air-cooling fan, and so forth driven by the actuator drive section 2080. The actuator 3000 is provided in the sheet feed section 1, the image forming section 2, the fixation section 3, and the sheet ejection section 4.

Figure 3:
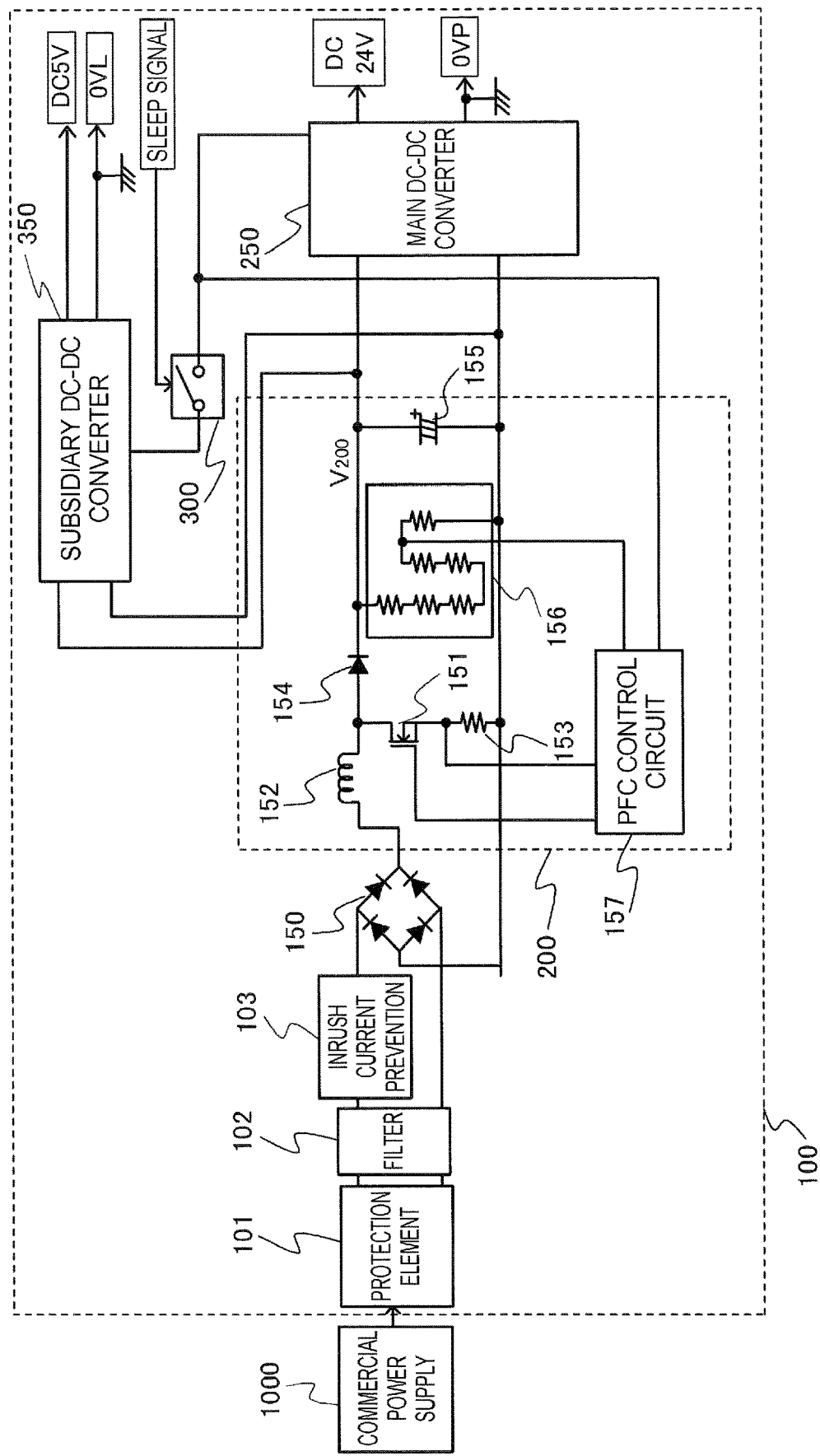
FIG. 3 is a circuit diagram showing a detailed configuration of a power supply section in the comparative example.

FIG. 3 is a circuit diagram showing a detailed configuration of the power supply section 100 in the comparative example shown in FIG. 2. The power supply section 100 includes a protection element 101, a filter 102, an inrush current prevention circuit 103, the bridge diode 150, a PFC power device 151, a PFC coil 152, a current detection resistor 153, a PFC diode 154, a PFC output smoothing capacitor 155, a voltage feedback detection section 156, a PFC control circuit 157, the main DC-DC converter 250, the switch circuit 300 and the subsidiary DC-DC converter 350.

The protection element 101 includes, for example, a fuse for overcurrent protection and a varistor for lightning surge protection. The filter 102 includes, for example, a common choke coil or a normal choke coil and a capacitor. The capacitor of the filter 102 includes, for example, an X capacitor arranged between LINE and NEUTRAL and a Y capacitor arranged between LINE or NEUTRAL and FG (Frame Ground).

The inrush current prevention circuit 103 is a circuit for inhibiting an inrush current to the PFC output smoothing capacitor 155. The inrush current prevention circuit 103 includes a thermistor, for example. Despite being cheap, the thermistor is incapable of inhibiting the inrush current at high temperatures. Therefore, the inrush current prevention circuit 103 is desired to be formed with a circuit including a combination of a resistor and a triac as a semiconductor switch element, a circuit including a combination of a resistor and a relay, or the like.

The bridge diode 150 is, for example, a rectification circuit formed with four diodes. The bridge diode 150 shown in FIG. 3 is a full-wave rectification circuit. The PFC control circuit 157 is a control section of the PFC circuit 200 that receives the AC input voltage full-wave rectified by the bridge diode 150 as the input and converts and boosts the full-wave rectified AC input voltage into a DC voltage. The PFC control circuit 157 is generally formed with a purpose-built IC (Integrated Circuit) or a microcomputer. The configuration of the rectification circuit as typified by the bridge diode 150 is not limited to the configuration shown in the diagram.

In cases of worldwide input, the DC output voltage after the boosting by the PFC circuit 200 is generally set at approximately 390V according to the following expression (1):

$$(\text{AC input voltage} \times \sqrt{2}) + 10V = (AC264V \times \sqrt{2}) + 10V = 390V \qquad (1)$$

Incidentally, while the PFC circuit 200 in FIG. 3 is a one-phase circuit, the PFC circuit 200 can also be a circuit of two or more phases (e.g., two or three phases).

The PFC control circuit 157 receives the result of detection by the voltage feedback detection section 156 and the result of detection by the current detection resistor 153 as inputs and determines and outputs a gate voltage of the PFC power device 151. Further, an output voltage of an auxiliary winding of the subsidiary DC-DC converter 350 is inputted to the PFC control circuit 157 as a power supply voltage.

The PFC coil 152 is a booster coil. The PFC power device 151 is a power device for switching, and its gate input terminal is supplied with the gate voltage from the PFC control circuit 157. The current detection resistor 153 is a resistor for detecting a drain current of the PFC power device 151. The result of detecting the drain current is outputted to the PFC control circuit 157. The PFC diode 154 is a rectification diode that outputs a PFC output voltage $V_{200}$ as the DC output voltage after the boosting to the PFC output smoothing capacitor 155.

The PFC output smoothing capacitor 155 is an electrolytic capacitor that smoothes the PFC output voltage $V_{200}$. The voltage feedback detection section 156 divides the PFC output voltage $V_{200}$ and outputs a voltage detection result corresponding to the PFC output voltage $V_{200}$ to the PFC control circuit 157.

The subsidiary DC-DC converter 350 is a circuit that receives the PFC output voltage $V_{200}$ as the input and outputs DC 5V to the control section 2000. The subsidiary DC-DC converter 350 includes an insulated transformer in which the primary side and the secondary side are insulated from each other. The output voltage of the auxiliary winding (not shown) of the insulated transformer is used as a power supply voltage of the PFC control circuit 157 and the main DC-DC converter 250. Further, the switch circuit 300 turns on or off the output voltage of the auxiliary winding of the subsidiary DC-DC converter 350 based on whether the sleep signal outputted from the control section 2000 is at a high level (Hi) or a low level (Lo).

The main DC-DC converter 250 is a circuit that receives the PFC output voltage $V_{200}$ as the input and outputs DC 24V to the control section 2000. The main DC-DC converter 250 and a circuit receiving DC 24V from the main DC-DC converter 250 are referred to also as a "load circuit". Similarly to the subsidiary DC-DC converter 350, the main DC-DC converter 250 includes an insulated transformer. Further, the output voltage of the auxiliary winding of the subsidiary DC-DC converter 350 is inputted to a control circuit (not shown) of the main DC-DC converter 250 via the switch circuit 300.

Figure 4:
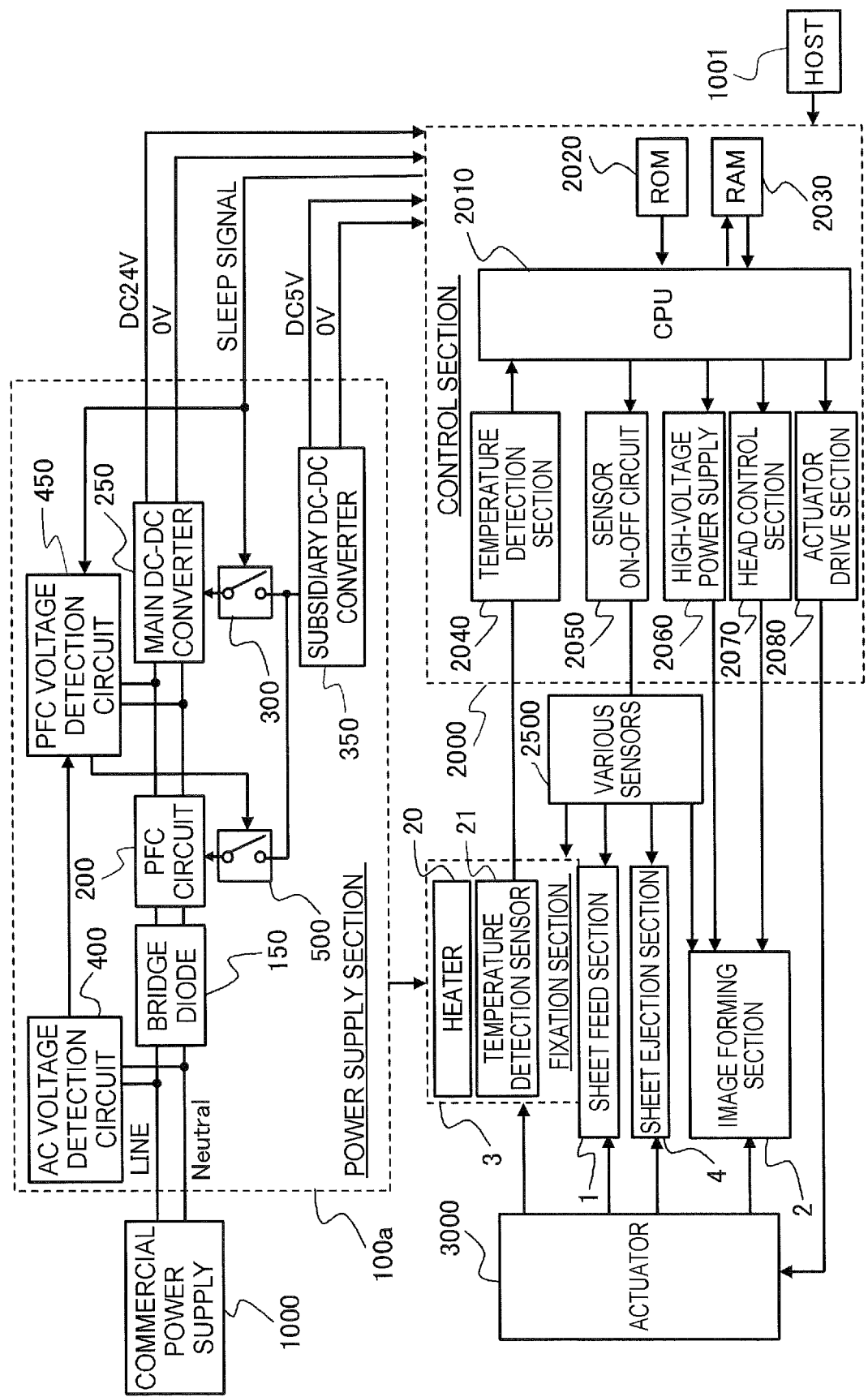
FIG. 4 is a block diagram schematically showing the configuration of the image forming device according to the first embodiment.

FIG. 4 is a block diagram schematically showing the configuration of the image forming device 50 according to the first embodiment of the present invention. In FIG. 4, each component identical or corresponding to a component shown in FIG. 2 (comparative example) is assigned the same reference character as in FIG. 2. The image forming device 50 according to the first embodiment includes a power supply section 100a as a power supply device, the fixation section 3, and the control section 2000 as principal components. The power supply section 100a shown in FIG. 4 differs from the power supply section 100 shown in FIG. 2 in including an AC voltage detection circuit 400, a PFC voltage detection circuit (DC output voltage detection circuit) 450 and a switch circuit 500. However, the power supply section 100a can also be configured without the AC voltage detection circuit 400.

The AC voltage detection circuit 400 detects the AC input voltage inputted to AC input lines LINE and NEUTRAL connected to the commercial power supply 1000. The PFC voltage detection circuit 450 supplies the switch circuit 500 with a signal for controlling the switch circuit 500 based on a PFC output from the PFC circuit 200, the status of the sleep signal, and the AC input voltage detected by the AC voltage detection circuit 400. The switch circuit 500 is turned on or off according to the sleep signal supplied from the control section 2000 and the signal supplied from the PFC voltage detection circuit 450.

Figure 5:
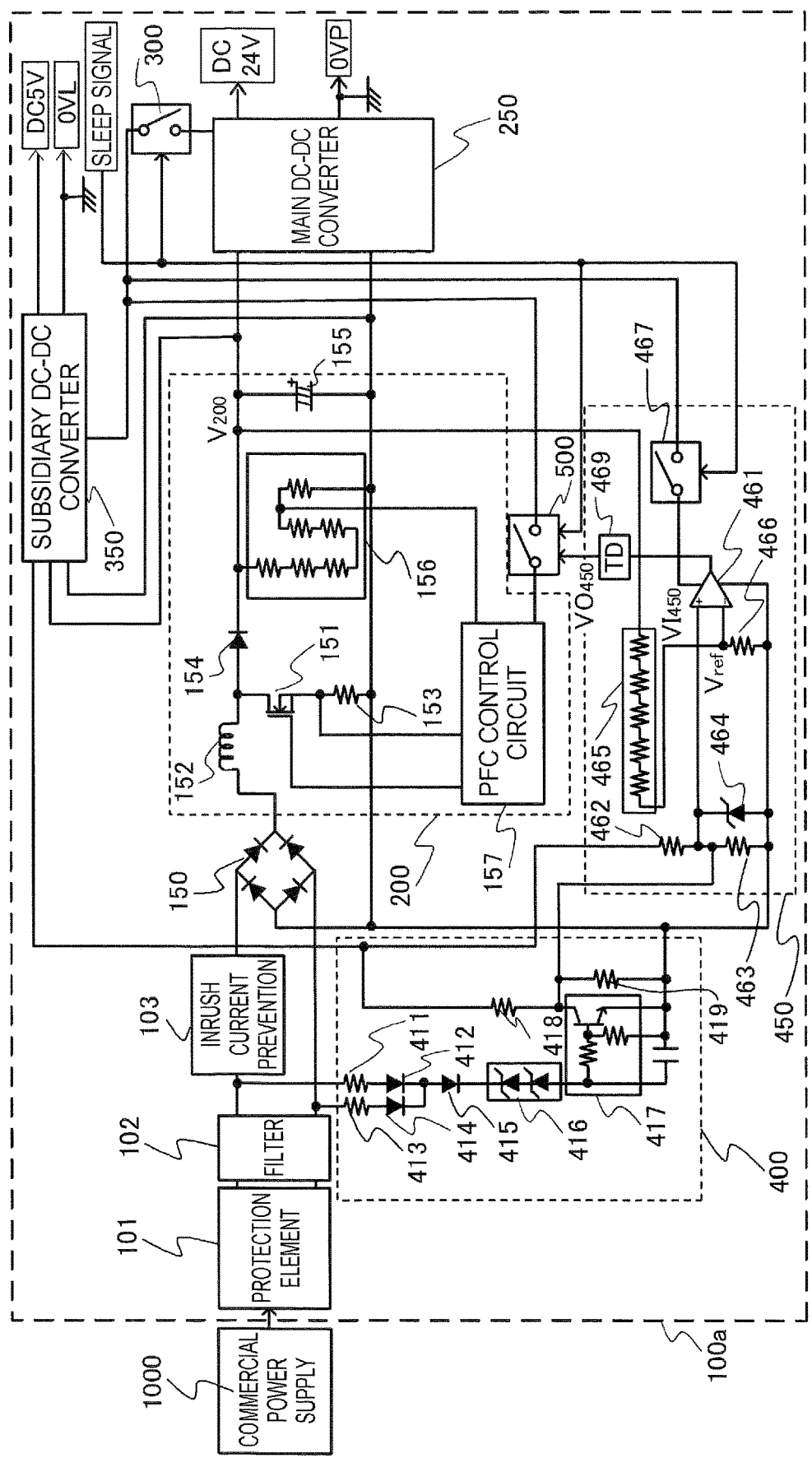
FIG. 5 is a circuit diagram showing a detailed configuration of a power supply section according to the first embodiment.

FIG. 5 is a circuit diagram showing a detailed configuration of the power supply section 100a shown in FIG. 4. In FIG. 5, each component identical or corresponding to a component shown in FIG. 3 (comparative example) is assigned the same reference character as in FIG. 3. The power supply section 100a shown in FIG. 5 differs from the power supply section 100 shown in FIG. 3 in including the AC voltage detection circuit 400, the PFC voltage detection circuit 450 and the switch circuit 500.

The AC voltage detection circuit 400 includes a current-limiting resistor 411 and a rectification diode 412 connected to the AC input line LINE and a current-limiting resistor 413 and a rectification diode 414 connected to the AC input line NEUTRAL. Further, the AC voltage detection circuit 400 includes a rectification diode 415 installed presuming failure of the rectification diode 412 or the rectification diode 414, a Zenner diode 416 connected to the rectification diode 415, a transistor 417 connected to the Zenner diode 416, a resistor 418 connected to the collector of the transistor 417, and a resistor 419 connected between the collector and the emitter of the transistor 417.

The PFC voltage detection circuit 450 includes a comparator 461. The comparator 461 has a + (plus) terminal as an input terminal for a reference voltage $V_{ref}$ and a − (minus) terminal as an input terminal for a PFC voltage input signal $VI_{450}$ as the resistive division voltage value of the PFC output voltage $V_{200}$. The PFC voltage detection circuit 450 includes voltage-dividing resistors 462 and 463 connected to the + terminal of the comparator 461, a Zenner diode 464, and voltage-dividing resistors 465 and 466 connected to the − terminal of the comparator 461. The PFC voltage input signal $VI_{450}$ corresponds to the PFC output voltage $V_{200}$. The switch circuit 500 is connected to an output terminal of the comparator 461 via a delay circuit 469. The switch circuit 500 receives a detection signal $V_{450}$ from the output terminal of the comparator 461 via the delay circuit 469. The switch circuit 500 is in an ON state when the sleep signal is Hi, or in an OFF state when the sleep signal is Lo. However, even when the sleep signal is Lo, the switch circuit 500 remains in the ON state in a period in which the detection signal $VO_{450}$ is Hi.

Figure 6:
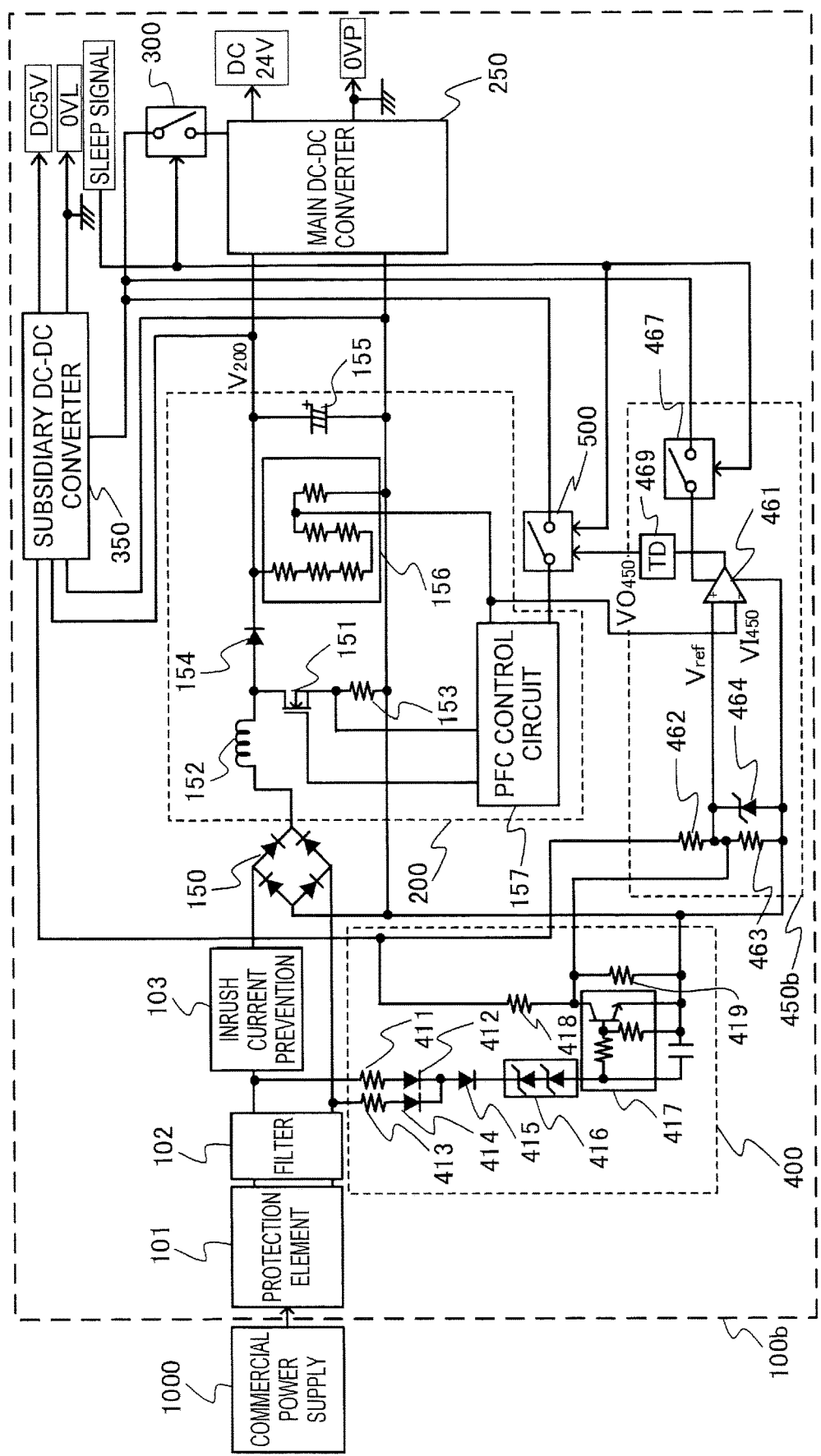
FIG. 6 is a circuit diagram showing a detailed configuration of a power supply section according to a modification of the first embodiment.

FIG. 6 is a circuit diagram showing a detailed configuration of a power supply section 100b according to a modification of the first embodiment. In FIG. 6, each component identical or corresponding to a component shown in FIG. 5 is assigned the same reference character as in FIG. 5. The power supply section 100b shown in FIG. 6 differs from the power supply section 100a shown in FIG. 5 in that the voltage-dividing resistors 462 and 463 connected to the + terminal of the comparator 461 set at the reference voltage $V_{ref}$ of the comparator are not installed, and in that the + terminal of the comparator 461 is connected to the voltage feedback detection section 156. Except for the above-described features, the power supply section 100b is the same as the power supply section 100a.

(1-2) Operation of First Embodiment

First, the operation of the comparative example shown in FIG. 2 and FIG. 3 will be described below. FIGS. 7A to 7F are time charts showing operational waveforms of the power supply device 100 in the comparative example shown in FIG. 2 and FIG. 3. In FIGS. 7A to 7F, the vertical axis represents voltage or electric power and the horizontal axis represents time. The operation of the power supply section 100 in the comparative example will be described below with reference to FIG. 2, FIG. 3, and FIGS. 7A to 7F. Incidentally, the image forming device has a normal operation mode and the sleep mode as the energy saving mode in which the power consumption is lower than that in the normal operation mode.

Figure 7:
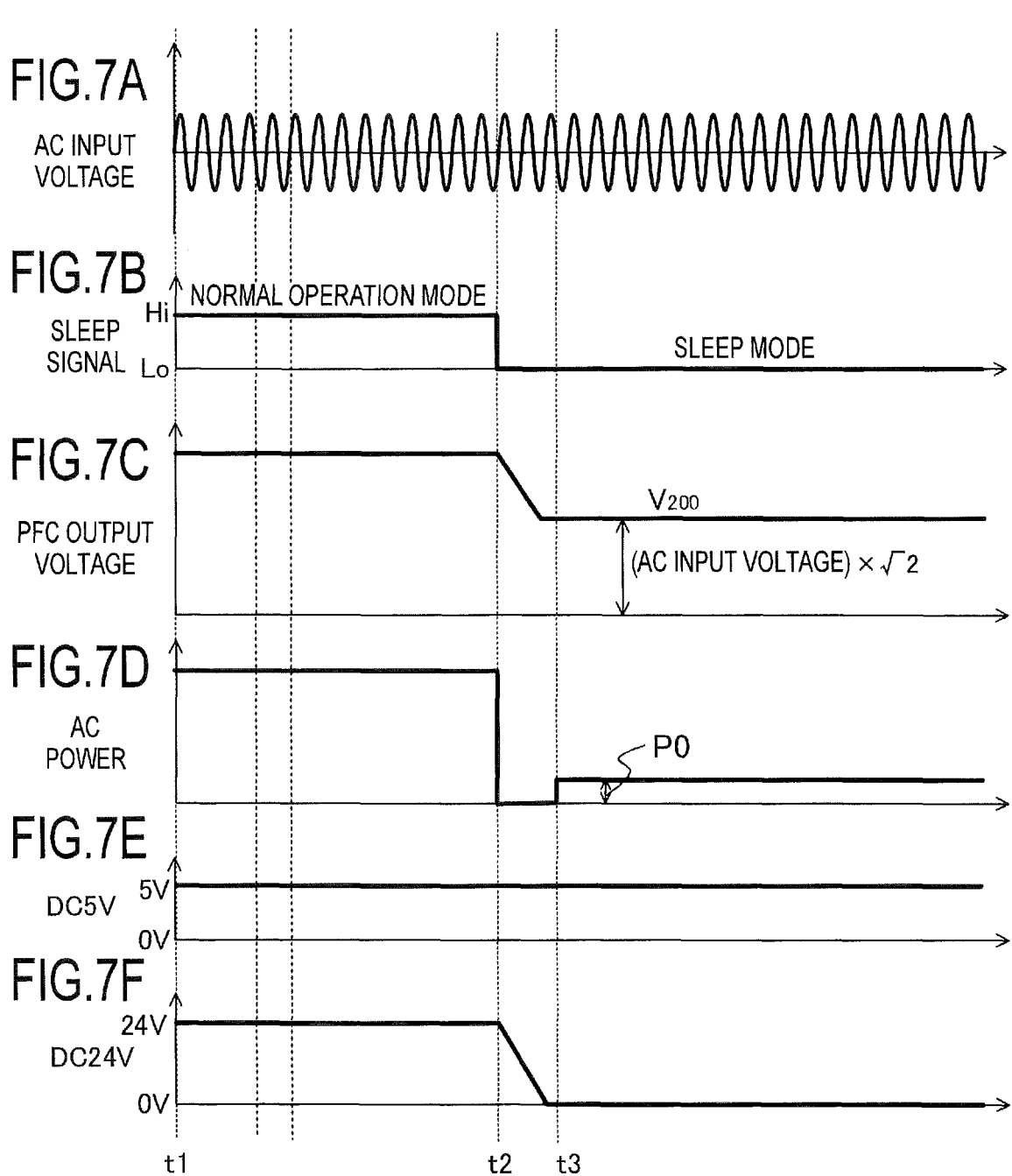
FIGS. 7A to 7F are time charts showing operational waveforms of the power supply section in the comparative example.

FIG. 7A shows the AC input voltage outputted from the commercial power supply 1000 and inputted to the power supply section 100. FIG. 7B shows the sleep signal supplied from the control section 2000 to the power supply section 100. The high level (Hi) of the sleep signal indicates the normal operation mode (e.g., operation standby mode), while the low level (Lo) of the sleep signal indicates the sleep mode as the energy saving mode. Upon the shift from the normal operation mode to the sleep mode, the switch circuit 300 shifts to an OFF state and the main DC-DC converter 250 shifts to a stopped state.

FIG. 7C shows the PFC output voltage $V_{200}$ as a DC voltage outputted from the PFC circuit 200. In consideration of the maximum voltage of the AC input voltage inputted to the power supply section 100, in cases of worldwide input, the PFC output voltage is generally set at approximately 390V as shown in the aforementioned expression (1).

FIG. 7D shows AC power as the power consumption of the image forming device. The AC power varies depending on the operation mode of the device. In the period of the time t1 to t2 in FIG. 7D, the image forming device 50 is in the normal operation mode. After the time t2, the image forming device 50 is in the sleep mode. As shown in FIG. 7E, the subsidiary DC-DC converter 350 continues outputting DC 5V. As shown in FIG. 7F, the main DC-DC converter 250 outputs DC 24V in the period of the time t1 to t2, stops the operation at the time t2, and stops the output of DC 24V.

At the time t1 in FIGS. 7A to 7F, waveforms in the normal operation mode are shown. At that time, the sleep signal outputted from the control section 2000 is Hi as shown in FIG. 7B, the power supply section 100 outputs DC 5V and DC 24V as shown in FIGS. 7E and 7F, and the PFC output voltage $V_{200}$ is DC 390V as shown in FIG. 7C. Therefore, the AC power consumed by the load circuit is high as shown in FIG. 7D.

At the time t2 in FIGS. 7A to 7F, the control section 2000 switches the sleep signal from Hi to Lo and the image forming device is switched from the normal operation mode to the sleep mode. Due to the sleep signal switched from Hi to Lo, the switch circuit 300 shifts to the OFF state and the supply of the output voltage of the auxiliary winding of the subsidiary DC-DC converter 350 to a power supply terminal VCC of a non-illustrated control IC of the main DC-DC converter 250 after the switch circuit 300 and to a power supply terminal VCC of the PFC control circuit 157 of the PFC circuit 200 is interrupted. Accordingly, the operation of the main DC-DC converter 250 and the PFC circuit 200 stops as shown in FIG. 7F and the PFC output voltage $V_{200}$ gradually drops (i.e., droops) as shown in FIG. 7C. At the time t2, the consumed AC power takes on a value close to 0 W as shown in FIG. 7D. This is because the PFC output smoothing capacitor 155 is charged at DC 390V when the PFC circuit 200 is in operation and starts discharging electricity due to the stoppage of the operation of the PFC circuit 200 and "PFC output voltage $V_{200} \geq$ AC input voltage$\times\sqrt{2}$" holds in cases where the bridge diode 150 as a full-wave rectification circuit is used. In other words, the consumed AC power drops to 0 W because the subsidiary DC-DC converter 350 operates by use of electric power supplied by the electric discharge of the PFC output smoothing capacitor 155.

At the time t3 in FIGS. 7A to 7F, consumption of the AC power by the subsidiary DC-DC converter 350 occurs after a relationship "PFC output voltage $V_{200} \leq$ AC input voltage$\times\sqrt{2}$" is satisfied, and consumption of constant AC power P0 continues as shown in FIG. 7D until the operation mode is switched.

Next, the operation of the power supply section 100a as the power supply device according to the first embodiment shown in FIG. 5 will be described below. FIGS. 8A to 8I are time charts showing an example of operational waveforms of the power supply section 100a shown in FIG. 4 and FIG. 5. In FIGS. 8A to 8I, the vertical axis represents voltage or electric power and the horizontal axis represents time. Incidentally, the image forming device 50 has the normal operation mode and the sleep mode as the energy saving mode in which the power consumption is lower than that in the normal operation mode.

Figure 8:
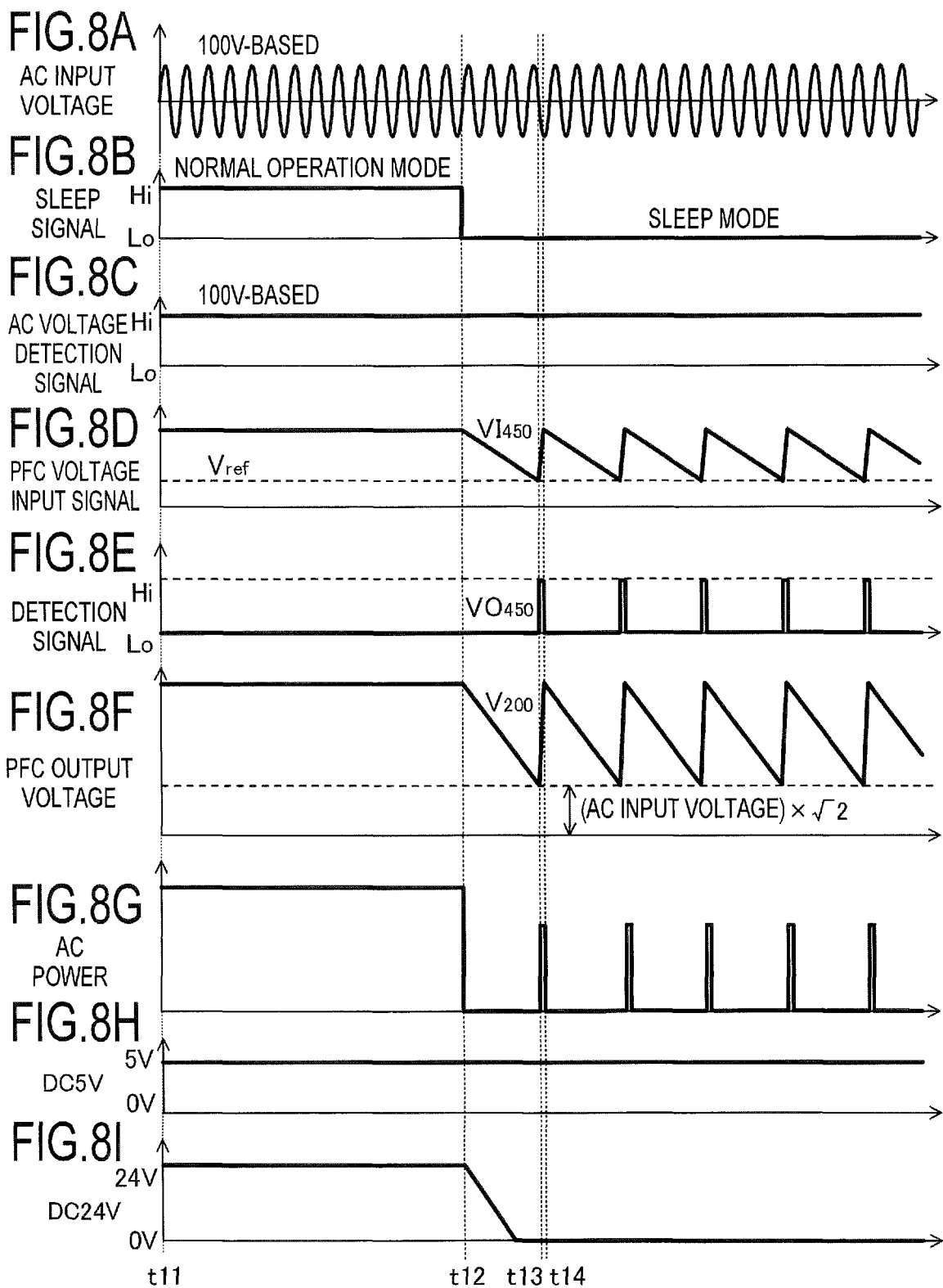
FIGS. 8A to 8I are time charts showing an example of operational waveforms of the power supply section according to the first embodiment.

FIG. 8A shows the AC input voltage outputted from the commercial power supply 1000 and inputted to the power supply section 100a. FIG. 8B shows the sleep signal supplied from the control section 2000 to the power supply section 100a. The operational waveforms in FIGS. 8A and 8B are the same as those in FIGS. 7A and 7B.

FIG. 8C shows the result of the detection of the AC input voltage by the AC voltage detection circuit 400. FIG. 8C shows a signal indicating whether the AC input voltage shown in FIG. 8A is a 100 voltage system (i.e., the AC input voltage is AC 90V to 140V) or a 230 voltage system (i.e., the AC input voltage is AC 198V to 264V). FIG. 8C shows the collector-emitter voltage of the transistor 417 of the AC voltage detection circuit 400. The collector-emitter voltage of the transistor 417 is Hi when the AC input voltage of the 100 voltage system is detected, or Lo when the AC input voltage of the 230 voltage system is detected.

FIG. 8D shows the PFC voltage input signal $VI_{450}$ inputted to the − terminal of the comparator 461 and the reference voltage $V_{ref}$ inputted to the + terminal of the comparator 461. The PFC voltage input signal $VI_{450}$ is the resistive division voltage value of the PFC output voltage $V_{200}$. For example, the reference voltage $V_{ref}$ is a threshold value equal to $\sqrt{2}$ times the AC input voltage as the voltage of the AC power. The reference voltage $V_{ref}$ may also be a threshold value greater than or equal to 2 times the AC input voltage as the voltage of the AC power.

FIG. 8E shows the detection signal $VO_{450}$ inputted to the switch circuit 500. The detection signal $VO_{450}$ is the output signal of the comparator 461. The detection signal $VO_{450}$ is Lo when the PFC voltage input signal $VI_{450}$ is higher than the reference voltage $V_{ref}$, and temporarily rises to Hi when the PFC voltage input signal $VI_{450}$ becomes less than or equal to the reference voltage $V_{ref}$.

FIG. 8F shows the PFC output voltage $V_{200}$ as the DC voltage outputted from the PFC circuit 200. In consideration of the maximum voltage of the AC input voltage, in cases of worldwide input, the PFC output voltage $V_{200}$ is generally set at approximately 390V as shown in the aforementioned expression (1).

FIG. 8G shows the AC power supplied to the image forming device 50. The AC power varies depending on the operation mode of the device. In the period of the time t11 to t12 in FIG. 8G, the image forming device 50 is in the normal operation mode (e.g., operation standby mode). After the time t12, the image forming device 50 is in the sleep mode. As shown in FIG. 8H, the subsidiary DC-DC converter 350 continues outputting DC 5V. As shown in FIG. 8I, the main DC-DC converter 250 outputs DC 24V in the period of the time t11 to t12 and thereafter stops the operation.

At the time t11 in FIGS. 8A to 8I, the waveforms in the normal operation mode are shown. The normal operation mode includes, for example, a print mode, a standby mode, and a power save mode. At that time, the sleep signal outputted from the control section 2000 is Hi as shown in FIG. 8B, the power supply section 100a outputs DC 5V and DC 24V as shown in FIGS. 8H and 8I, and the PFC output voltage $V_{200}$ is approximately 390V as shown in FIG. 8F. Therefore, the AC power consumed by the load circuit and the like is high as shown in FIG. 8G. Further, FIG. 8C indicates that the AC input voltage inputted to the power supply section 100a is within the range of 90V to 140V as the 100 voltage system. In this case, the transistor 417 of the AC voltage detection circuit 400 is in a state in which no base current flows, and the collector-emitter voltage of the transistor 417 is Hi. Here, as for the Zenner diode 416, the Zenner voltage has to be set at a value higher than the maximum value 140V of the 100 voltage system as the AC input voltage, and the AC input voltage needs to maintain the Zenner diode 416 off within the range of 90V to 140V.

At the time t12 in FIGS. 8A to 8I, the sleep signal from the control section 2000 switches from Hi to Lo and the image forming device 50 shifts to the sleep mode. Due to the sleep signal switching from Hi to Lo, the switch circuit 300 turns off and the output of the output voltage of the auxiliary winding of the subsidiary DC-DC converter 350 to the power supply terminal VCC of the control IC of the main DC-DC converter 250 after the switch circuit 300 and to the power supply terminal VCC of the PFC control circuit 157 of the PFC circuit 200 is interrupted. Accordingly, the operation of the main DC-DC converter 250 and the PFC circuit 200 stops and the PFC output voltage $V_{200}$ gradually drops (i.e., droops). Further, the DC 24V output voltage gradually drops as shown in FIG. 8I. At that time, the consumed AC power takes on a value close to 0 W as shown in FIG. 8G.

At the time t13 in FIGS. 8A to 8I, the drooping of the PFC output voltage $V_{200}$ continues and the drooping of the PFC voltage input signal $VI_{450}$ as the resistive division voltage value of the PFC output voltage $V_{200}$ also continues. At a time point when "reference voltage $V_{ref} \geq$ PFC voltage input signal $VI_{450}$" is satisfied, the detection signal $VO_{450}$ outputted from the PFC voltage detection circuit 450 becomes Hi for a prescribed time. At that time, the switch circuit 500 in the OFF state shifts to the ON state, the output voltage of the auxiliary winding of the subsidiary DC-DC converter 350 is supplied to the power supply terminal VCC of the PFC control circuit 157, the PFC circuit 200 is put in operation, and the PFC output voltage $V_{200}$ is raised to a prescribed voltage. At that time, the consumption of the AC power occurs as shown in FIG. 8G since the PFC circuit 200 is put in operation.

At the time t14 in FIGS. 8A to 8I, "reference voltage $V_{ref}<$PFC voltage input signal $VI_{450}$" is satisfied and the detection signal $VO_{450}$ outputted from the PFC voltage detection circuit 450 becomes Lo. At that time, the switch circuit 500 shifts to the OFF state, the supply of the output voltage of the auxiliary winding of the subsidiary DC-DC converter 350 to the power supply terminal VCC of the PFC control circuit 157 stops, and the operation of the PFC circuit 200 is stopped. At that time, the drooping of the PFC output voltage $V_{200}$ starts as shown in FIG. 8F and the AC power drops to 0 W as shown in FIG. 8G. Here, in regard to the ON time of the switch circuit 500, the time it takes to shift from the state of "reference voltage $V_{ref} \geq$ PFC voltage input signal $VI_{450}$" to the state of "reference voltage $V_{ref}<$PFC voltage input signal $VI_{450}$" is short and there is the apprehension that the PFC circuit 200 might turn off before the PFC output voltage $V_{200}$ rises to the prescribed voltage; however, it is possible to secure the time until the rise of the PFC output voltage $V_{200}$ to the prescribed voltage by providing the switch circuit 500 with a time constant of a CR circuit or the like by using the delay circuit 469. Further, it is possible to optimize the time until the rise of the PFC output voltage $V_{200}$ to the prescribed voltage by switching the time constant according to the AC input voltage detection result. By repeating the discharging operation from the time t12 to the time t13 and the charging operation from the time t13 to the time t14, the input voltage of the subsidiary DC-DC converter 350 increases, and thereby the efficiency of the subsidiary DC-DC converter 350 increases and the efficiency of the power supply section 100a in the sleep mode increases.

By repeating the above-described operation, the subsidiary DC-DC converter 350 in the sleep mode operates by consuming the energy accumulated in the PFC output smoothing capacitor 155, and thus the power consumption of the power supply section 100a occurs intermittently as shown in FIG. 8G. The power consumption of the power supply section 100a can be made lower than that in the case of the power consumption in the comparative example in the sleep mode (P0 in FIG. 7D). Accordingly, the efficiency of the subsidiary DC-DC converter 350 increases, enabling the increase in the efficiency of the power supply section 100a in the sleep mode.

FIGS. 9A to 9I are time charts showing another example of operational waveforms of the power supply section 100a shown in FIG. 4 and FIG. 5. The operational waveforms in FIGS. 9A to 9I differ from those in FIGS. 8A to 8I indicating the case of the AC power of the 100 voltage system in indicating the case of the AC power of the 230 voltage system.

Figure 9:
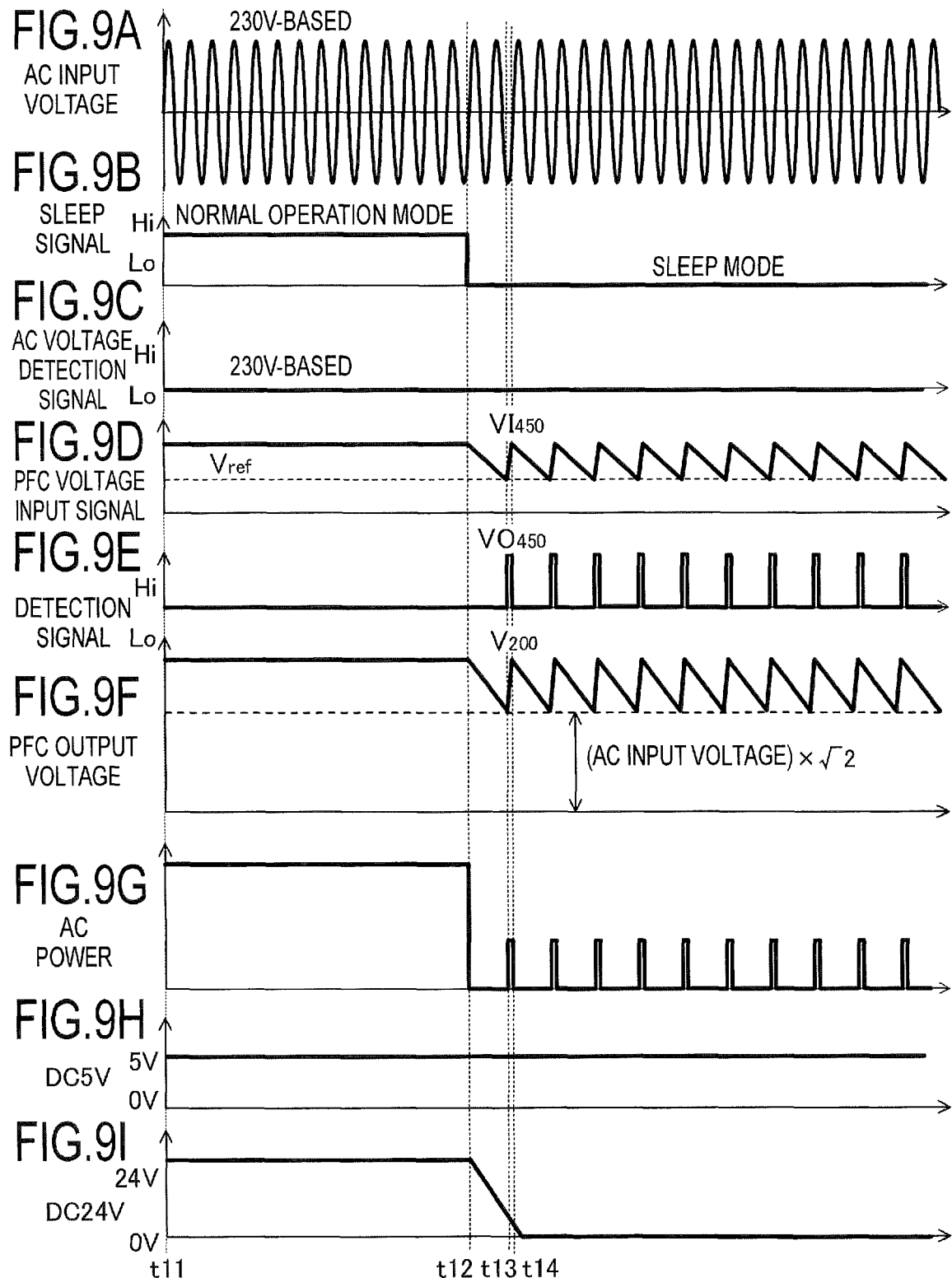
FIGS. 9A to 9I are time charts showing another example of operational waveforms of the power supply section according to the first embodiment.

FIG. 9A shows the AC input voltage outputted from the commercial power supply 1000 and inputted to the power supply section 100a. In FIG. 9A, the AC input voltage is the 230 voltage system. FIG. 9C shows the result of the detection of the AC input voltage by the AC voltage detection circuit 400. In FIG. 9C, Lo is outputted since the AC input voltage shown in FIG. 9A is the 230 voltage system. The operational waveforms in FIGS. 9B and 9D to 9I are similar to those in FIGS. 8B and 8D to 8I.

Further, the operational waveforms of the power supply section 100b shown in FIG. 6 are similar to those of the power supply section 100a shown in FIG. 5. Since the power supply section 100b uses only one resister as both the voltage-dividing resistor for detecting the PFC output voltage $V_{200}$ and the resistor for the voltage feedback detection, the number of components can be reduced.

(1-3) Effect of First Embodiment

As described above, according to the first embodiment, the PFC output voltage $V_{200}$ in the normal operation mode is controlled in the vicinity of DC 390V by sequential control, and the PFC output voltage $V_{200}$ in the sleep mode is controlled by pulse drive control as shown in FIG. 8E and FIG. 9E. Therefore, the PFC output voltage $V_{200}$ is controlled approximately in a range between 390V and "AC input voltage×$\sqrt{2}$" as shown in FIG. 8F and FIG. 9F. The input voltage of the subsidiary DC-DC converter 350 increases and the efficiency of the subsidiary DC-DC converter 350 increases, enabling the increase in the power supply efficiency in the sleep mode.

Further, reducing the number of components becomes possible by connecting a part of the PFC voltage detection circuit 450 to the voltage feedback circuit of the PFC circuit 200.

In the above-described example, a threshold voltage as the reference voltage $V_{ref}$ of the PFC voltage detection circuit 450 is determined based on the AC input voltage detected by the AC voltage detection circuit 400. However, an upper limit voltage of the AC input voltage is described in the product specification sheet, product nameplate or the like of the power supply device. Therefore, the reference voltage $V_{ref}$ as the threshold voltage is desired to be set less than or equal to $\sqrt{2}$ times the upper limit voltage of the AC voltage specified by the product specifications to be inputtable.

Further, in cases where the AC voltage detection circuit 400 is left out to reduce the number of components, the reference voltage $V_{ref}$ as the threshold voltage of the PFC voltage detection circuit 450 may be fixed at 2 times the upper limit voltage of the AC voltage specified by the product specifications to be inputtable and described in the product specification sheet, product nameplate or the like.

(2) Second Embodiment

(2-1) Configuration of Second Embodiment

Figure 10:
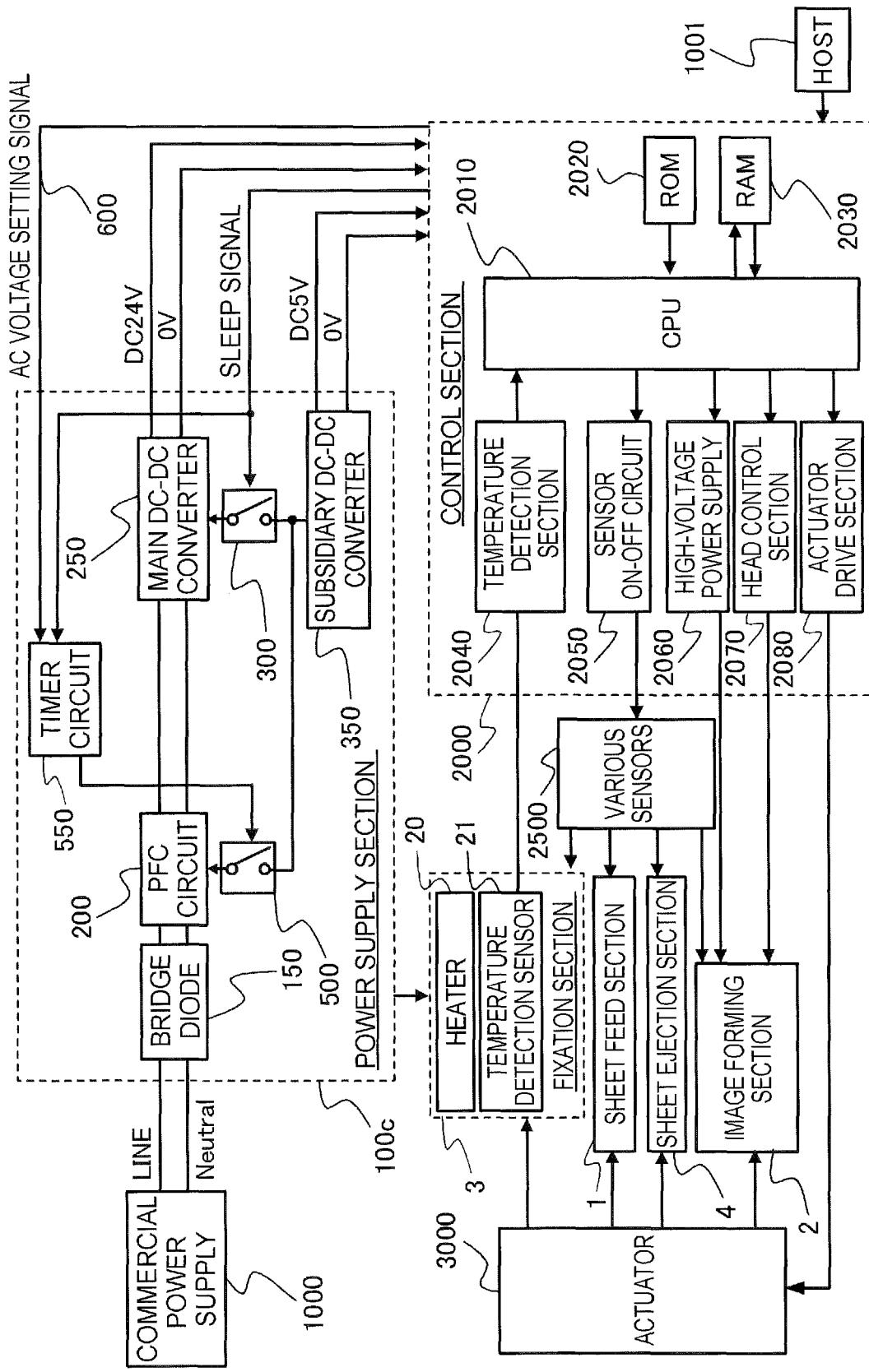
FIG. 10 is a block diagram schematically showing the configuration of an image forming device according to a second embodiment of the present invention.

FIG. 10 is a block diagram schematically showing the configuration of an image forming device according to a second embodiment. In FIG. 10, each component identical or corresponding to a component shown in FIG. 2 (comparative example) is assigned the same reference character as in FIG. 2. The image forming device according to the second embodiment includes a power supply section 100c as a power supply device, the fixation section 3, and the control section 2000 as principal components. The power supply section 100c shown in FIG. 10 differs from the power supply section 100 shown in FIG. 2 in including a timer circuit 550 as a cyclic signal generation circuit and the switch circuit 500. Further, in the second embodiment, an AC voltage setting signal 600 is outputted from the control section 2000 and inputted to the timer circuit 550.

Figure 11:
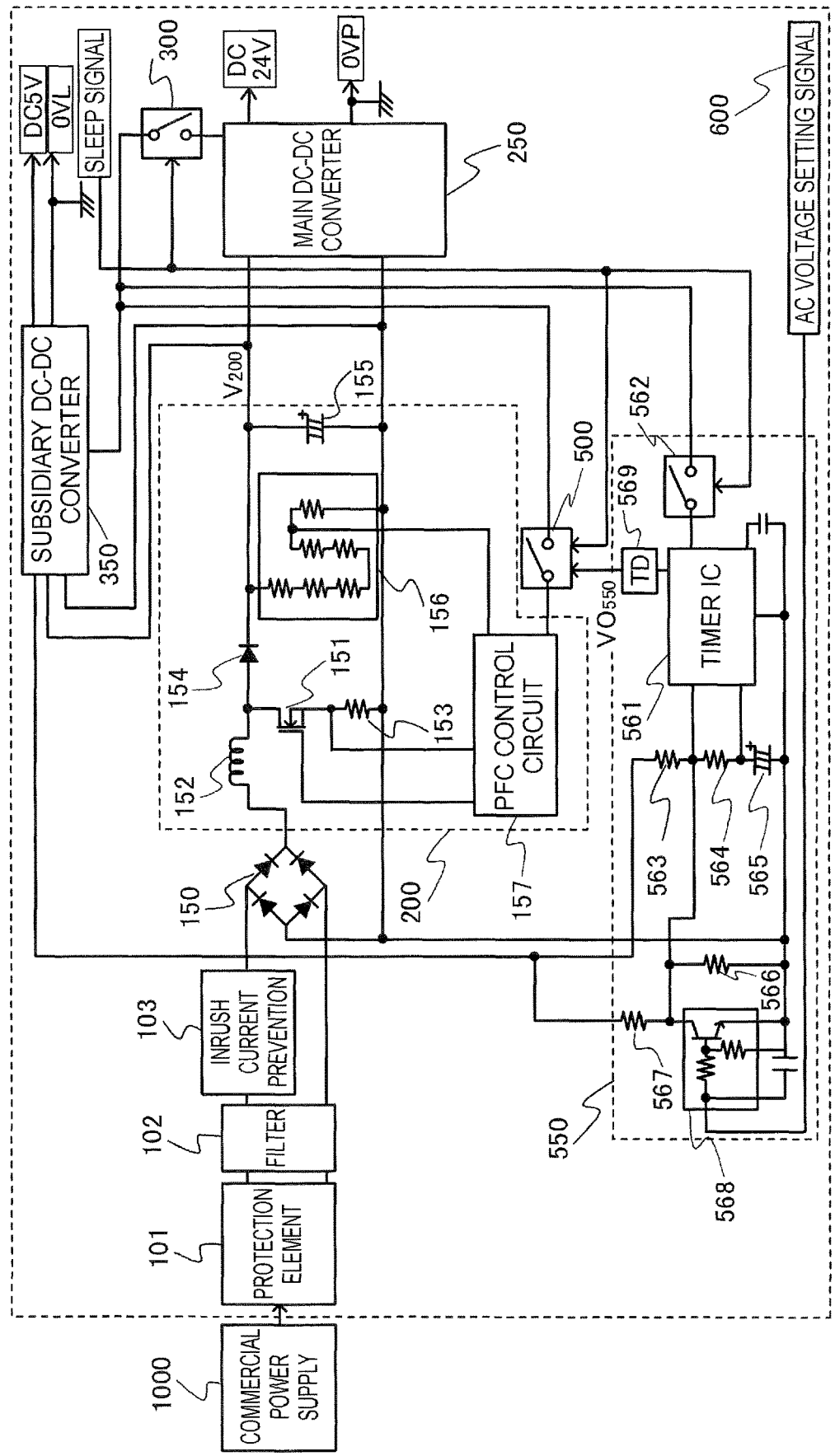
FIG. 11 is a circuit diagram showing a detailed configuration of a power supply section according to the second embodiment.

FIG. 11 is a circuit diagram showing a detailed configuration of the power supply section 100c shown in FIG. 10. In FIG. 11, each component identical or corresponding to a component shown in FIG. 3 (comparative example) is assigned the same reference character as in FIG. 3. The power supply section 100c shown in FIG. 11 differs from the power supply section 100 shown in FIG. 3 in including the timer circuit 550 and the switch circuit 500. In the second embodiment, the timer circuit 550 outputs a timer IC output $VO_{550}$ as a predetermined cyclic signal to the switch circuit 500.

As shown in FIG. 11, the timer circuit 550 includes a timer IC 561, a switch 562 connected to the timer IC 561 and switching the presence/absence of power supply, voltage-dividing resistors 563 and 564 for setting a timer switching time, an electrolytic capacitor 565, a transistor 568 using the AC voltage setting signal 600 as a gate signal, a resistor 567 connected to the collector of the transistor 568, a resistor 566 connected between the collector and the emitter of the transistor 568, and a delay circuit 569 that delays the timer IC output $VO_{550}$ of the timer IC. The switch circuit 500 is connected to an output terminal of the timer IC 561. The switch circuit 500 is in the ON state when the sleep signal is Hi and in the OFF state when the sleep signal is Lo. However, even when the sleep signal is Lo, the switch circuit 500 remains in the ON state in a period in which the timer IC output $VO_{550}$ is Hi.

(2-2) Operation of Second Embodiment

Next, the operation of the power supply section 100c as the power supply device according to the second embodiment shown in FIG. 11 will be described below. FIGS. 12A to 12H are time charts showing an example of operational waveforms of the power supply section 100c shown in FIG. 10 and FIG. 11. In FIGS. 12A to 12H, the vertical axis represents voltage or electric power and the horizontal axis represents time. Incidentally, the image forming device according to the second embodiment has the normal operation mode and the sleep mode as the energy saving mode in which the power consumption is lower than that in the normal operation mode.

The operational waveforms in FIGS. 12A, 12B, 12G and 12H are respectively the same as those in FIGS. 8A, 8B, 8H and 8I regarding the first embodiment.

FIG. 12D shows the timer IC output $VO_{550}$ as the output signal of the timer IC 561. The timer IC output $VO_{550}$ periodically repeats turning on and off at a constant cycle. Namely, the timer IC output $VO_{550}$ intermittently turns on upon each cycle of the timer circuit 550. The length of one cycle of the timer circuit 550 is switched according to the AC voltage setting signal 600 shown in FIG. 12C. The timer IC 561 that periodically repeats turning on and off at a constant cycle outputs the timer IC output $VO_{550}$ that is in the ON state for a certain time at a constant cycle. The timer IC output $VO_{550}$ is Lo when the PFC control circuit 157 is not put in operation, and the timer IC output $VO_{550}$ is Hi when the PFC control circuit 157 is put in operation.

FIG. 12E shows the PFC output voltage $V_{200}$ as a DC output voltage outputted from the PFC circuit 200. In consideration of the AC input voltage, in cases of worldwide input, the DC voltage outputted from the PFC circuit 200 is generally set at approximately 390V according to the aforementioned expression (1).

FIG. 12F shows the AC power consumed by the image forming device, which varies depending on the operation mode of the device.

At the time t21 in FIGS. 12A to 12H, the waveforms in the normal operation mode are shown. At that time, the sleep signal outputted from the control section 2000 is Hi as shown in FIG. 12B, the power supply section 100c outputs DC 5V and DC 24V as shown in FIGS. 12G and 12H, and the PFC output voltage $V_{200}$ is approximately 390V as shown in FIG. 12E. Therefore, the AC power consumed by the load circuit is high as shown in FIG. 12F. The load circuit includes the main DC-DC converter 250, the control section 2000 and so forth, for example.

At the time t22 in FIGS. 12A to 12H, the control section 2000 switches the sleep signal from Hi to Lo and the image forming device is switched from the normal operation mode to the sleep mode. Due to the sleep signal switched from Hi to Lo, the switch circuit 300 shifts to the OFF state and the supply of the output voltage of the auxiliary winding of the subsidiary DC-DC converter 350 to the power supply terminal VCC of the control IC of the main DC-DC converter 250 and to the power supply terminal VCC of the PFC control circuit 157 of the PFC circuit 200 is interrupted. Accordingly, the operation of the main DC-DC converter 250 stops and the operation of the PFC circuit 200 stops as shown in FIG. 12H and the PFC output voltage $V_{200}$ gradually drops (i.e., droops) as shown in FIG. 12E. At the time t22, the consumed AC power takes on a value close to 0 W as shown in FIG. 12F. This is because the PFC output smoothing capacitor 155 is charged at approximately DC 390V when the PFC circuit 200 is in operation and starts discharging electricity due to the stoppage of the operation of the PFC circuit 200. In other words, the consumed AC power drops to 0 W because the subsidiary DC-DC converter 350 operates by use of electric power supplied by the electric discharge of the PFC output smoothing capacitor 155.

At the time t23 in FIGS. 12A to 12H, the drooping of the PFC output voltage $V_{200}$ due to the electric discharge continues, and the timer IC output $VO_{550}$ temporarily becomes Hi for a prescribed time (time t23-t24) at a prescribed cycle. At that time, the switch circuit 500 in the OFF state temporarily shifts to the ON state, the output voltage of the auxiliary winding of the subsidiary DC-DC converter 350 is temporarily supplied to the power supply terminal VCC of the PFC control circuit 157, the PFC circuit 200 is put in operation, and the PFC output voltage $V_{200}$ is raised to a prescribed voltage. At that time, the consumption of the AC power occurs as shown in FIG. 12F since the PFC circuit 200 is put in operation.

Further, when the drooping of the PFC output voltage $V_{200}$ due to the electric discharge is fast, a state of "PFC output voltage $V_{200}$=AC input voltage×$\sqrt{2}$" occurs before one cycle of the timer IC output $VO_{550}$ elapses as indicated by the time t25. Although the period from the time t25 to the time t26 is a period before the elapse of one cycle of the timer IC output $V_{550}$, the state of "PFC output voltage $V_{200}$=AC input voltage×$\sqrt{2}$" has occurred and thus the PFC output voltage $V_{200}$ is maintained at "AC input voltage×$\sqrt{2}$" and the AC power is consumed. In the second embodiment, the switch circuit 500 repeats turning on and off at a constant cycle, and thus the drooping of the PFC output voltage $V_{200}$ can be sharp depending on the electric power consumed by the load circuit. In such cases where the droop speed of the PFC output voltage $V_{200}$ is higher than normal, the PFC output voltage $V_{200}$ reaches "AC input voltage×$\sqrt{2}$" and thus the consumption of the AC power occurs.

Thereafter, the timer IC output $VO_{550}$ temporarily becomes Hi for a prescribed time (time t26-t27) at a prescribed cycle. At that time, the switch circuit 500 in the OFF state temporarily shifts to the ON state, the output voltage of the auxiliary winding of the subsidiary DC-DC converter 350 is temporarily supplied to the power supply terminal VCC of the PFC control circuit 157, the PFC circuit 200 is put in operation, and the PFC output voltage $V_{200}$ is raised to the prescribed voltage. At that time, the consumption of the AC power occurs as shown in FIG. 12F since the PFC circuit 200 is put in operation.

By repeating the above-described operation, the subsidiary DC-DC converter 350 in the sleep mode operates by consuming the energy accumulated in the PFC output smoothing capacitor 155, and thus the power consumption of the power supply section 100c occurs intermittently as shown in FIG. 12F. The power consumption of the power supply section 100c can be made lower than that in the case of the power consumption in the comparative example in the sleep mode (P0 in FIG. 7D). Accordingly, the efficiency of the subsidiary DC-DC converter 350 increases, enabling the increase in the efficiency of the power supply section 100c in the sleep mode.

FIGS. 13A to 13H are time charts showing another example of operational waveforms of the power supply section 100c shown in FIG. 10 and FIG. 11. FIGS. 13A to 13H differ from FIGS. 12A to 12H indicating the case of the AC power of the 100 voltage system in indicating the case of the AC power of the 230 voltage system.

FIG. 13A shows the AC input voltage outputted from the commercial power supply 1000 and inputted to the power supply section 100c. In FIG. 13A, the AC input voltage is the 230 voltage system. FIG. 13C shows the result of the detection of the AC input voltage by the AC voltage detection circuit 400. In FIG. 13C, Lo is outputted since the AC input voltage shown in FIG. 13A is the 230 voltage system. The operational waveforms in FIGS. 13B and 13D to 13H are similar to those in FIGS. 12B and 12D to 12H.

(2-3) Effect of Second Embodiment

As described above, according to the second embodiment, the PFC output voltage $V_{200}$ in the normal operation mode is controlled at approximately DC 390V by the sequential control, and the PFC output voltage $V_{200}$ in the sleep mode is controlled by the pulse drive control as shown in FIG. 12D and FIG. 13D. Therefore, the PFC output voltage $V_{200}$ is controlled approximately in the range between 390V and "AC input voltage×$\sqrt{2}$" as shown in FIG. 12E and FIG. 13E. The input voltage of the subsidiary DC-DC converter 350 increases and the efficiency of the subsidiary DC-DC converter 350 increases, enabling the increase in the efficiency of the power supply in the sleep mode.

Further, in the second embodiment, the control is performed so that electric power is periodically supplied to the PFC output smoothing capacitor 155, and thus the PFC output voltage $V_{200}$ is controlled around reaching "AC input voltage×$\sqrt{2}$". Therefore, electric power efficiency in the second embodiment tends to be slightly lower than that in the first embodiment. However, since the PFC voltage detection circuit 450 can be replaced with the timer circuit 550 and the AC voltage detection circuit 400 can be substituted with the reception of the AC voltage setting signal 600, the number of components of the power supply section 100c can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A power supply device comprising:
a rectification circuit that is supplied with AC power from an AC power supply;
a power factor improvement circuit that boosts an output voltage of the rectification circuit, smooths a boosted voltage with a capacitor, and thereby generates a DC output voltage outputted to a load circuit;
a DC-DC converter that steps down the DC output voltage to a prescribed first voltage;
a DC output voltage detection circuit that detects whether or not the DC output voltage satisfies a prescribed condition; and
a switch circuit that temporarily puts the power factor improvement circuit in an operating state by use of the first voltage each time the prescribed condition is satisfied in a period in which the power factor improvement circuit is in a stopped state due to an energy saving mode of the load circuit.

2. The power supply device according to claim 1, wherein the prescribed condition is satisfied when a resistive division voltage value of the DC output voltage falls to or below a prescribed reference voltage.

3. The power supply device according to claim 2, wherein the reference voltage is a threshold value greater than or equal to $\sqrt{2}$ times an AC input voltage as a voltage of the AC power.

4. The power supply device according to claim 2, wherein the reference voltage is a threshold value less than or equal to $\sqrt{2}$ times an upper limit voltage of an AC voltage to be inputtable specified in specifications of a product.

5. The power supply device according to claim 2, further comprising an AC voltage detection circuit that detects an AC input voltage as a voltage of the AC power,
wherein the reference voltage is determined based on the AC input voltage detected by the AC voltage detection circuit.

6. A power supply device comprising:
a rectification circuit that is supplied with AC power from an AC power supply;
a power factor improvement circuit that boosts an output voltage of the rectification circuit, smooths a boosted voltage with a capacitor, and thereby generates a DC output voltage outputted to a load circuit;
a DC-DC converter that steps down the DC output voltage to a prescribed first voltage;
a cyclic signal generation circuit that outputs a predetermined cyclic signal with passage of time; and
a switch circuit that temporarily puts the power factor improvement circuit in an operating state by use of the first voltage each time the cyclic signal generation circuit outputs the cyclic signal in a period in which the power factor improvement circuit is in a stopped state due to an energy saving mode of the load circuit.

7. The power supply device according to claim 6, wherein the cyclic signal generation circuit is a timer circuit that outputs a timer signal each time a prescribed constant time is counted.

8. The power supply device according to claim 7, wherein the cyclic signal generation circuit determines the prescribed constant time based on an AC voltage setting signal acquired from the load circuit.

9. The power supply device according to claim 1, wherein the DC-DC converter consumes energy accumulated in the capacitor in the period in which the power factor improvement circuit is in the stopped state due to the energy saving mode of the load circuit.

10. The power supply device according to claim 9, wherein energy is accumulated in the capacitor when the power factor improvement circuit is temporarily put in the operating state in the period in which the power factor improvement circuit is in the stopped state due to the energy saving mode of the load circuit.

11. The power supply device according to claim 1, wherein the temporary operating state of the power factor improvement circuit occurs intermittently.

12. An image forming device comprising the power supply device according to claim 1.

* * * * *